(12) United States Patent
Marupaduga (10) Patent No.: US 11,330,658 B1
(45) Date of Patent: May 10, 2022

(54) PAIRING OF ACCESS NODES FOR DUAL-CONNECTIVITY BASED ON EVALUATION OF INTER-ACCESS-NODE DELAY

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/948,694

(22) Filed: Sep. 29, 2020

(51) Int. Cl.
*H04W 24/10* (2009.01)
*H04W 76/16* (2018.01)
*H04W 92/10* (2009.01)
*H04W 84/18* (2009.01)

(52) U.S. Cl.
CPC .......... *H04W 76/16* (2018.02); *H04W 24/10* (2013.01); *H04W 84/18* (2013.01); *H04W 92/10* (2013.01)

(58) Field of Classification Search
CPC ..... H04W 76/16; H04W 24/10; H04W 92/10; H04W 84/18
See application file for complete search history.

(56) References Cited

U.S. PATENT DOCUMENTS

| | | | |
|---|---|---|---|
| 2015/0341838 A1 | 11/2015 | Pinheiro et al. | |
| 2016/0028533 A1* | 1/2016 | Kazmi | H04W 72/0413 370/296 |
| 2016/0212790 A1 | 7/2016 | Fujishiro et al. | |
| 2018/0084513 A1 | 3/2018 | Sheashua et al. | |
| 2020/0178331 A1* | 6/2020 | Xu | H04W 76/16 |

OTHER PUBLICATIONS

Galeana-Zapien and Ferrus, "Design and Evaluation of a Backhaul-Aware Base Station Assignment Alogorithm for OFDMA-Based Cellular Networks," IEEE Transactions on Wireless Communications, vol. 9, No. 10, Oct. 2010.

* cited by examiner

*Primary Examiner* — Chuong A Ngo (57) ABSTRACT

A method and system to control configuration of dual-connectivity service a user equipment device (UE), wherein the dual-connectivity service including the UE being served concurrently by a master node (MN) over a first connection and by a secondary node (SN) over a second connection. An example method includes (i) identifying multiple pairs of access nodes as candidate pairs of access nodes to be the MN and SN for the dual-connectivity service, (ii) for each identified pair, determining an inter-access-node communication delay, (iii) comparing the determined inter-access-node communication delays of the identified pairs and, based on the comparing, selecting one of the identified pairs to be the MN and SN for the dual-connectivity service, and (iv) causing the dual-connectivity service to be set up for the UE with the selected pair of access nodes being the MN and SN for the dual-connectivity service.

19 Claims, 4 Drawing Sheets

PAIRING OF ACCESS NODES FOR DUAL-CONNECTIVITY BASED ON EVALUATION OF INTER-ACCESS-NODE DELAY

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could be configured to provide coverage and service on one or more radio-frequency (RF) carriers. Each such carrier could be frequency division duplex (FDD), with separate frequency channels for downlink and uplink communication, or time division duplex (TDD), with a single frequency channel multiplexed over time between downlink and uplink use. And each such frequency channel could be defined as a specific range of frequency (e.g., in RF spectrum) having a bandwidth and a center frequency and thus extending from a low-end frequency to a high-end frequency.

Further each carrier could be defined within an industry standard frequency band, by its frequency channel(s) being defined within the frequency band. Examples of such frequency bands include (i) bands 2, 4, 12, 25, 26, 66, 71, and 85, supporting FDD carriers (ii) band 41, supporting TDD carriers, and (iii) bands n258, n260, and n261, supporting FDD and TDD carriers, among numerous other possibilities.

On the downlink and uplink, the air interface provided by an access node on a given carrier could be configured in a specific manner to define physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry reference signals or the like that UEs could measure in order to determine coverage strength, and other resource elements could be reserved to carry other control signaling such as PRB-scheduling directives and acknowledgement messaging from the access node to UEs. And on the uplink, certain resource elements could be reserved to carry random access signaling from UEs to the access node, and other resource elements could be reserved to carry other control signaling such as PRB-scheduling requests, acknowledgement messaging, and channel-quality reports from UEs to the access node.

Overview

When a UE enters into coverage of an example network, the UE could detect threshold strong coverage of an access node on a particular carrier (e.g., a threshold strong reference signal broadcast by the access node on that carrier) and could then engage in random-access and connection signaling, such as Radio Resource Control (RRC) signaling, to establish an RRC connection or the like through which the access node will then serve the UE on the carrier. Further, if the UE is not already registered for service with the core network, the UE could transmit to the access node an attach request, which the access node could forward to a core-network controller for processing. And the core-network controller and access node could then coordinate setup for the UE of a bearer extending between the UE and a core-network gateway that provides transport-network connectivity, with the bearer including a data radio bearer portion extending between the UE and the access node an access-bearer portion extending between the access node and the gateway.

Once the UE is so connected and registered, the access node could then serve the UE in a connected mode on the carrier, managing downlink air-interface communication of packet data to the UE and uplink air-interface communication of packet data from the UE.

With the example air interface described above, for instance, when packet data for the UE arrives at the core network from a transport network, the data could flow over the UE's access bearer to the UE's serving access node, and the access node could then schedule and provide transmission of that data to the UE on particular downlink PRBs of the carrier. Likewise, when the UE has data to transmit on the transport network, the UE could transmit a scheduling request to the access node, the access node could responsively schedule transmission of that data from the UE on particular uplink PRBs of the carrier, and the UE could accordingly transmit the data to the access node for forwarding over the UE's access bearer and through the core network to the transport network.

When the industry advances from one generation of wireless technology to the next, or in other scenarios, networks and UEs may also support dual-connectivity service, where a UE is served on multiple co-existing connections, perhaps according to different respective RATs.

For instance, a first access node could be configured to provide service according to a first RAT and a second access node could be configured to provide service according to a second RAT, and a UE positioned concurrently within coverage of both the first and second access nodes could have a first radio configured to engage in service according to the first RAT and a second radio configured to engage in service according to the second RAT. With this arrangement, the UE may be able to establish a first air-interface connection with the first access node according to the first RAT and a second air-interface connection with the second access node according to the second RAT, and the access nodes may then concurrently serve the UE over those connections according to their respective RATs.

Such dual connectivity (or "non-standalone" connectivity) could help facilitate increased peak data-rate of communications, by multiplexing the UE's communications across the multiple air-interface connections. Further or alternatively, dual connectivity may provide other benefits compared with serving a UE on a single connection (as "standalone" connectivity).

In a representative dual-connectivity implementation, one of the access nodes could operate as a master node (MN), responsible for coordinating setup, management, and teardown of dual-connectivity service for the UE and functioning as an anchor point for RRC signaling and core-network control signaling related to the dual-connected UE. And each of one or more other access nodes could operate as a secondary node (SN) mainly to provide additional connectivity and increased aggregate bandwidth for the UE.

When a UE that supports dual-connectivity service enters into coverage of such a system, the UE could initially scan for and detect coverage of a first-RAT access node on a first-RAT carrier and engage in signaling to establish a first-RAT connection between the UE and that access node on that carrier as discussed above.

In addition, perhaps having determined from profile data that the UE is dual-connectivity-capable, the UE's serving access node, acting as an MN, could engage in a process to configure dual connectivity for the UE.

For instance, the MN could first identify a second-RAT access node to serve as an SN for the UE, perhaps based on measurement reporting from the UE or based on certain coverage assumptions. And the MN could then engage in signaling with the core-network controller, with the SN, and with the UE, to establish a second-RAT connection between the UE and the SN on a second-RAT carrier, so that the MN could then serve the UE on the UE's first-RAT connection concurrently with the SN serving the UE on the UE's second-RAT connection.

Further, the MN could coordinate bearer connectivity for the UE via the SN, to enable a portion of the UE's packet-data flow to be served by the MN concurrently with another portion of the UE's packet-data flow being served by the SN. Various bearer configurations are possible for this purpose. In one arrangement, for instance, the UE's access bearer could remain between the MN and the core-network gateway, with a leg of the bearer extending between the MN and the SN, so that the portion of the UE's data flow served by the SN could flow between the SN and the gateway via the MN. And in another arrangement, the UE's access bearer could be reconfigured from being between the MN and the gateway to instead being between the SN and the gateway, and with a leg of the bearer extending between the MN and the SN, so that the portion of the portion of the UE's data flow served by the MN could flow between the MN and the gateway via the SN.

With these first-RAT and second-RAT connections and bearer connectivity established for the UE, the MN and SN could then serve the UE with packet-data communications on their respective connections with the UE, each in the manner discussed above, for instance with a portion of data flowing over the UE's first-RAT connection between the UE and the MN concurrently with another portion of the data flowing over the UE's second-RAT connection between the UE and the SN.

With such dual connectivity, it could be important for communications to flow smoothly and quickly between the UE's serving MN and the UE's serving SN. This is especially so if a portion of the UE's packet-data communications will pass between the MN and SN as noted above, as quick and successful exchange of that data could help facilitate higher overall throughput for the UE. Further, this could be the case as well for various control signaling that may pass between the MN and SN in relation to the UE's dual-connectivity service, such as information related to the operational status of the SN for instance.

The present disclosure provides a mechanism to help optimize the speed of communications between a dual-connected UE's MN and SN, particularly to help minimize the delay of such inter-access-node communications. The disclosed mechanism addresses a scenario where multiple different pairs of MN and SN could potentially be used for a UE's dual-connectivity service, with the pairs differing from each other in terms of their MN and/or their SN. According to disclosure, when dual-connectivity service is going to be set up for the UE, a computing system will evaluate MN-SN communication delay respectively for each of various such candidate MN-SN pairs and will select, based on a comparison of communication delays of the various candidate MN-SN pairs, one of the MN-SN pairs to use. And based on this decision, the computing system will then cause dual-connectivity service to be set up for the UE with the selected MN-SN pair.

As one example of this, if the UE is currently served by an access node that would be the UE's MN and the UE reports being within threshold strong enough coverage of two or more candidate SNs, the MN could select an SN from the two or more candidate SNs with the selecting being based on communication delay between the MN and the selected SN being lower than communication delay between the MN and each one or more other SN of the candidate SNs. And the MN could then set up the UE's dual connectivity with itself as the UE's MN and the selected SN as the UE's SN.

As another example, if the UE is currently served by an access node that would be the UE's MN (MN1) and the UE has reported being within threshold strong coverage of a single candidate SN and also another candidate MN (MN2), MN1 could decide whether or not to hand the UE over to the MN2 based on MN-SN communication delay. For instance, the SN could determine which of MN1 and MN2 has a lower communication delay for communication with the SN and could inform MN1. If MN1's communication with the SN is lower than MN2's communication delay with the SN, then, based at least on that fact, MN1 could remain the UE's MN and set up dual connectivity for the UE with the SN. Whereas, if MN2's communication delay with the SN is lower than MN1's communication delay with the SN, then, based at least on that fact, MN1 could hand the UE over to MN2, and MN2 could then be the UE's MN and can set up dual connectivity for the UE with the SN.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of 4G LTE, 5G NR, and 4G-5G dual connectivity, referred to as EUTRA-NR Dual Connectivity (EN-DC).

With EN-DC, a 4G access node (4G evolved Node-B (eNB)) functions as the MN, and a 5G access node (5G next-generation Node-B (gNB)) functions the SN. Thus, a UE would first establish a standalone-4G connection with a 4G eNB, and the 4G eNB could then coordinate setup of EN-DC service for the UE, including setup for the UE of a secondary 5G connection with the 5G gNB and setup of bearer connectivity for the UE. And the 4G eNB and 5G gNB could then concurrently serve the UE over their respective 4G and 5G connections with the UE. It should be understood, however, that the principles disclosed herein could extend to apply with respect to other scenarios as well, such as with respect to other RATs and other dual-connectivity configurations, including possible a single-RAT dual-connectivity arrangement. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations.

Figure 1:
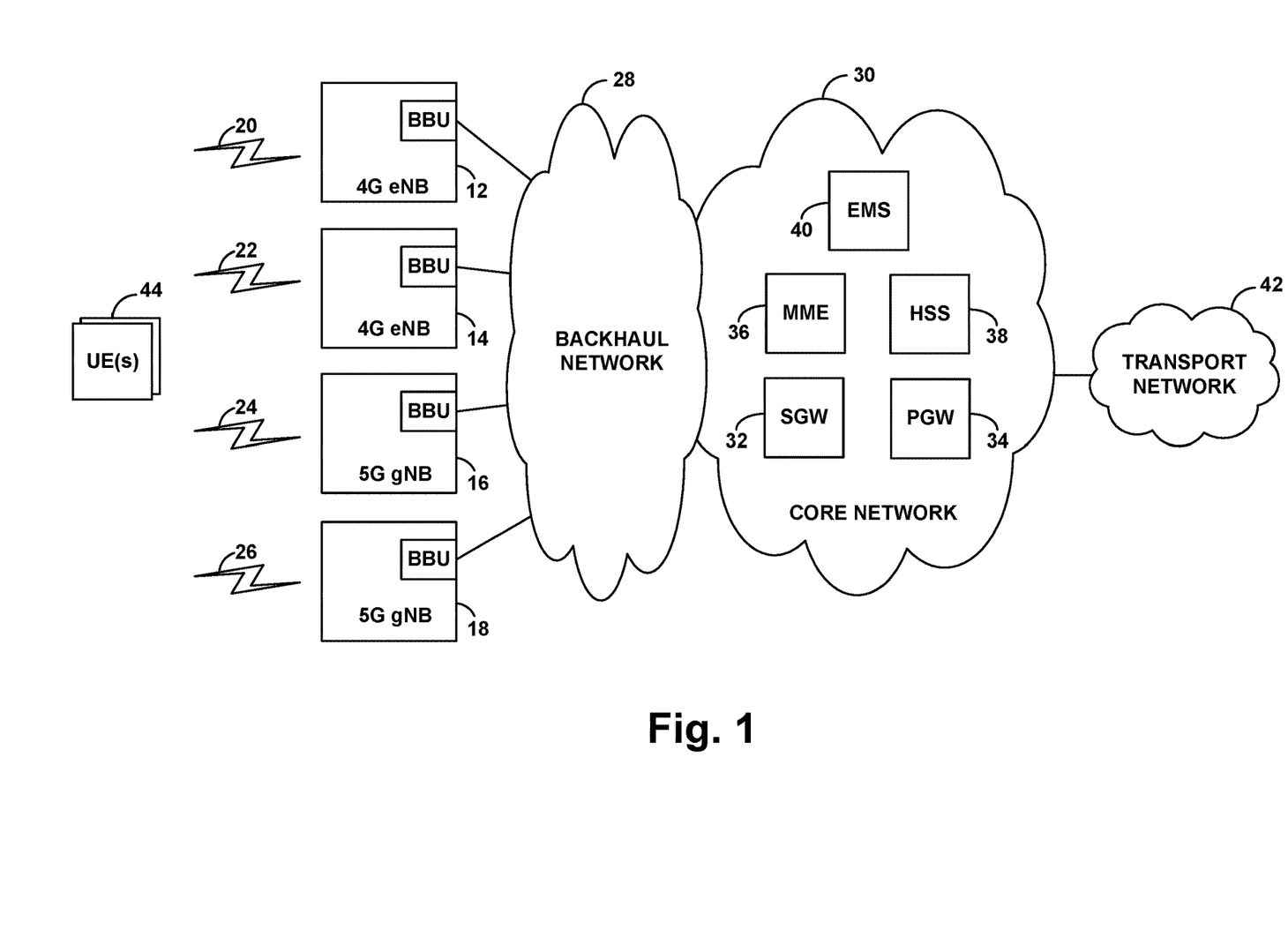
FIG. 1 is a simplified block diagram of an example network arrangement in which features of the present disclosure can be implemented.

Referring to the drawings, FIG. 1 is a simplified block diagram of an example network arrangement that includes four example access nodes, namely a first 4G eNB 12, a second 4G eNB 14, a first 5G gNB 16, and a second 5G gNB 18. Each of these access nodes could be a macro access node of the type configured to provide a wide range of coverage or could take other forms, such as a small cell access node, a relay, a femtocell access node, or the like, possibly configured to provide a smaller range of coverage. And the access nodes could vary in form from each other.

In an example implementation, each access node could include components such as at least one antenna structure (not shown), at least one radio head (not shown), and at least one baseband unit (BBU). These components could take various forms. For instance, an antenna structure could be an antenna array or a portion of an antenna array. A radio head could include a radio and other RF circuitry defining an RF transmit chain and an RF receive chain, with components such as power amplifiers, filters, and digital-analog converters, to facilitate RF communication via the access node's antenna structure. And a baseband unit could include processing components to facilitate baseband signal processing, general access node control, and backhaul communication.

Further, in the example implementation, each access node is configured to provide service and coverage on one or more carriers. For instance, 4G eNB 12 is configured to provide 4G service and coverage on one or more carriers 20, 4G eNB 14 is configured to provide 4G service and coverage on one or more carriers 22, 5G gNB 16 is configured to provide 5G service and coverage on one or more carriers 24, and 5G gNB 18 is configured to provide 5G service and coverage on one or more carriers 26. As noted above, each such carrier could be defined in a given frequency band and could have a given duplex mode (e.g., FDD or TDD). The coverage provided respectively by these various access nodes could also overlap with each other, to define an area in which a UE could be within coverage of multiple access nodes at once.

Further, the air interface on each carrier could be structured as described above by way of example, being divided over time into frames, subframes, and symbol time segments, and over frequency into subcarriers, thus defining an array of air-interface resource elements grouped into PRBs allocable by the access node as noted above, for use to carry data to or from served UEs. Although carrier-structure and/or service could differ between the 4G and 5G air interfaces in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

Note that various ones of the illustrated access nodes could be collocated with each other, such as by being at a common cell site location, possibly sharing common equipment such as a common antenna tower, equipment cabinet, or the like. For instance, an example cell site might include both a 4G eNB and a 5G gNB, to facilitate providing both 4G and 5G service.

Further, note that some of the illustrated access nodes might be integrated together in various ways but might be distinguished based on their frequency bands of operation and possibly other associated components or attributes. For instance, the two illustrated 4G eNBs 12, 14 might be collocated and integrated with each other but may operate on different frequency bands than each other, with each having its own respective antenna structure, radio head, baseband unit, and backhaul connection. Further, from another perspective, a single access node that provides service on two or more different frequency bands could be considered to be multiple access nodes, each providing service on a respective one of the frequency bands.

In the example implementation, the illustrated access nodes are all interfaced with a backhaul network 28 through which the access nodes could communicate with entities on a core network 30 and with each other. This backhaul network 28 could be a packet-switched network and/or combination of networks or other connections and could take various forms, including various routers, switches, and/or other nodes, some of which could be collocated with the access nodes and others of which could be upstream between the access nodes and the core network 30 and/or within the core network 30, among other possibilities.

Without limitation, for instance, each access node's baseband unit could have a network connection with a respective cell site router (CSR) (not shown) that is collocated with the access node, and various CSRs could have network connections with each other and/or with upstream routers or other nodes, to facilitate routing of packet data between CSRs and to/from various entities. Further, some access nodes might share use of a common CSR and/or other backhaul nodes or links.

Core network 30 could in turn be a packet-switched network such as an Evolved Packet Core (EPC) network or Next Generation Core (NGC) network, among other possibilities. In the example shown, the core network 30 includes a serving gateway (SGW) 32, a packet data network gateway (PGW) 34, a mobility management entity (MME) 36, a home subscriber server (HSS) 38, and an element management system (EMS) 40, although other arrangements are possible as well. This arrangement could support communication between various entities through virtual packet tunnels or the like.

In an example implementation, each access node could have an interface with SGW 32, the SGW 32 could have an interface with the PGW 34, and the PGW 34 could provide connectivity with a transport network 42. Further, each access node could have an interface with the MME 36, and the MME 36 could have an interface with the SGW 32, so that the MME 36 could coordinate setup of bearers for UEs to enable the UEs to engage in packet-data communication via 4G and 5G. Alternatively, just the 4G eNBs 12, 14 might have interfaces with the MME 36 and may function as an anchors for control signaling with the MME 36 both for 4G service and for EN-DC service. And an inter-access-node interface such as an X2 interface could be defined respectively between each pair of the illustrated access nodes to support inter-access-node communication.

Still further, the HSS 38 could store UE profile records, which could specify service-subscription plans, UE configurations, and/or other such UE capability information, such as whether a UE is EN-DC capable for instance. And the EMS 40 could operate as a central repository of operational data for the network and to control and manage operation of various network elements such as the access nodes.

FIG. 1 also illustrates examples UEs 44 that could be within coverage of the illustrated access nodes from time to time. Each UE could take any of the forms noted above, among other possibilities, and could be equipped with a 4G LTE radio and a 5G NR radio as well as associated circuitry and logic that enables the UE to engage in 4G LTE service, 5G NR service, and EN-DC service. Further, the various illustrated access nodes could also be configured to support providing EN-DC service.

When such a UE initially enters into coverage of the access nodes, the UE could initially scan for 4G coverage and, in an example implementation, could detect threshold strong coverage of 4G eNB 14. The UE could then engage in random access signaling and RRC configuration signaling with the 4G eNB 14 as discussed above to establish a 4G connection with the 4G eNB 14, and the 4G eNB 14 could establish in data storage a context record for the UE and could store in the context record an identification of the UE's established RRC connection.

In addition, the UE could transmit to the 4G eNB 14 an attach request message, which the 4G eNB 14 could forward to the MME 36 for processing. And upon authenticating and authorizing the UE for service, the MME 36 and 4G eNB 14 could coordinate setup for the UE of at least one user-plane bearer. For instance, the MME 32 could engage in signaling with the 4G eNB 14 and the SGW 32 to coordinate setup for the UE of an S1-U packet tunnel between the 4G eNB 14 and the SGW 32, and the SGW 32 could responsively engage in signaling with the PGW 34 to coordinate setup for the UE of an associated S5 packet tunnel between the SGW 32 and the PGW 34. Further, the 4G eNB 14 could engage in signaling with the UE to establish for the UE an associated data radio bearer (DRB).

Once the UE is connected with the 4G eNB 14 and registered with core network, the 4G eNB 14 could then serve the UE with wireless packet-data communications as noted above. For instance, when the 4G eNB 14 receives data for delivery to the UE, the 4G eNB 14 could coordinate air-interface transmission of that data on downlink PRBs from the 4G eNB 14 to the UE. And when the UE has data for delivery to the 4G eNB 14, the UE could transmit a scheduling request to the 4G eNB 14, and the 4G eNB 14 could coordinate air-interface transmission of that data on uplink PRBs from the UE to the 4G eNB 14.

In addition, in relation to the UE's attachment process or at another time, the 4G eNB 14 could receive from the MME 32 or from the UE a UE capability report indicating that the UE is EN-DC capable. And in response to this and/or one or more other triggers, the 4G eNB 14 could work to configure EN-DC service for the UE.

For instance, the 4G eNB 14 could first transmit to the UE a "B1" (inter-RAT) measurement object directing the UE to scan for 5G coverage, and the UE may provide the 4G eNB 14 with a measurement report indicating that the UE is within threshold strong coverage of 5G gNB 16 and/or 5G gNB 18, possibly specifying the detected coverage strength. In the event the UE reports being within threshold strong coverage of each of two of more such 5G gNBs, or if the 4G eNB 14 otherwise has a choice of which 5G gNB to use as an SN for EN-DC service of the UE, then the 4G eNB 14 might select one of the 5G gNBs, perhaps the one having higher reported coverage strength. Or if the UE reports being within threshold strong coverage of just one 5G gNB or the 4G eNB 14 otherwise knows of just one 5G gNB to use as an SN for EN-DC service of the UE, the 4G eNB 14 could decide to use that one 5G gNB.

In the example implementation, if we assume that the 5G gNB 16 will be used as the SN for EN-DC service of the UE, the 4G eNB 14 could then proceed to set up EN-DC service for the UE so that the UE can be served concurrently by the 4G eNB 14 and the 5G gNB 16.

For instance, the 4G eNB 14, operating as MN, could first engage in process to add the 5G gNB 16 as an SN for the UE, such as by transmitting to the 5G gNB 16 an SN-Addition request to cause the 5G gNB to allocate resources for a 5G connection for the UE, receiving an SN-Addition-Request acknowledge message from the 5G gNB 16, and engaging in associated RRC signaling with the UE, in response to which the UE could then access and complete establishment of the 5G connection.

Further, in line with the discussion above, the 4G eNB 14 could engage in signaling to establish bearer connectivity for the UE via the 5G gNB 16. For instance, maintaining the UE's S1-U tunnel between the SGW 32 and the 4G eNB 14, the 4G eNB 14 could engage in signaling with the 5G gNB 16 to arrange for exchange of a portion of the UE's data flow over an X2 interface between the 5G gNB 16 and 4G eNB 14 (e.g., transfer from the 5G gNB 16 to the 4G eNB 14 of uplink data that the 5G gNB 16 receives from the UE, and transfer from the 4G eNB 14 to the 5G gNB 16 of downlink data for transmission from the 5G gNB 16 to the UE). Or the 4G eNB 14 could engage in signaling with the MME 36 and the 5G gNB to arrange for transfer of the UE's S1-U tunnel to instead be between the SGW 32 and the 5G gNB and to arrange for exchange of a portion of the UE's data flow over the X2 interface between the 5G gNB 16 (e.g., transfer from the 4G eNB 14 to the 5G gNB 16 of uplink data that the 4G eNB 14 receives from the UE, and transfer from the 5G eNB 16 to the 4G eNB 14 of downlink data for transmission from the 4G eNB 14 to the UE).

With EN-DC set up in this or another manner for the UE, the 4G eNB 14 and 5G gNB 16 could then provide the UE with EN-DC service, concurrently serving the UE over their respective connections with the UE as discussed above. Namely, as each access node receives data that it will transmit over its respective air interface to the UE, the access node could buffer that data, allocate downlink PRBs of the access node's respective air interface, and transmit the buffered data to the UE in the allocated downlink PRBs. And as the UE has data for transmission respectively to each access node, the UE could buffer the data and send to the access node a scheduling request, the access node could allocate uplink PRBs of the access node's respective air-interface if and when available, and the UE could transmit the buffered data to the access node in the allocated uplink PRBs.

In line with the discussion above, minimizing the delay of communication between the UE's serving 4G eNB and the UE's serving 5G gNB could be important, as lower delay may facilitate quickly transmission of the UE's user-plane communications and/or quicker transmission of control-plane signaling related to service of the UE. Here, delay of communication between the UE's serving access nodes could be defined as the time it takes for data to pass from one of the access nodes to the other (or, for testing purposes, round-trip transmission time between the access nodes).

With the backhaul arrangement described above, there could be different network paths for communications respectively between different pairs of 4G eNB and 5G gNB, and the different network paths may have different communication delays then each other. For instance, communications between a 4G eNB and 5G gNB that share a common CSR might pass relatively quickly through that common CSR from access node to access node. Whereas, communications between a 4G eNB and a 5G gNB that have different respective CSRs may pass less quickly through a CSR serving one access node, through an upstream router, and through a CSR serving the other access node. These and/or other differences between the network paths of various eNB-gNB pairs could thus contribute to the eNB-gNB pairs having different eNB-gNB communication delay than each other.

Accordingly, in line with the present disclosure as discussed above, a computing system could work to help ensure that the pair of 4G eNB and 5G gNB that will provide the UE with EN-DC service will likely have the lowest eNB-gNB communication delay of various candidate pairs of 4G eNB and 5G gNB that could possibly provide the UE with EN-DC service.

For instance, when the UE's serving 4G eNB 14 is going to set up EN-DC service for the UE, the computing system could identify at least two candidate eNB-gNB pairs that could be used to provide the UE with EN-DC service, and the computing system could then select one of the identified eNB-gNB pairs based on the selected eNB-gNB pair having the lowest eNB-gNB communication delay of the identified candidate eNB-gNB pairs. And the computing system could then cause setup for the UE of EN-DC service to be provided by the selected eNB-gNB pair.

The computing system that carries out these or other such operations could be provided at the 4G eNB 14 with which the UE initially connects and/or at one or more other entities, such as at one or more other access nodes and/or at the EMS 40, among other possibilities.

To facilitate selecting an eNB-gNB pair to provide the UE with EN-DC service, the computing system could have access to data establishing a representative eNB-gNB communication delay respectively per eNB-gNB pair. For instance, for each pair, either or each access node of the pair could transmit an Internet Control Message Protocol (IMCP) PING echo request to the other access node of the pair and could receive from the other access node a PING response, establishing round-trip time for communication between the access nodes. Further, the access nodes could carry out this process periodically, to facilitate rolling up an average or other statistical measure representing eNB-gNB communication delay of the pair, or could carry out the process on demand, such as when the need arises to select an eNB-gNB pair for a UE. And the access nodes could report these measures to each other and/or to the EMS 40.

In an example implementation, when the UE at issue is currently connected with just 4G eNB 14, at issue could then be, based on an evaluation of eNB-gNB communication delay, which eNB-gNB pair should provide the UE with EN-DC service. Here, for instance, the analysis could identifying multiple candidate eNB-gNB pairs that could provide the UE with EN-DC service, predicting or otherwise determining likely eNB-gNB communication delay per pair based on data as noted above, and determining which of the eNB-gNB pairs has the lowest determined eNB-gNB communication delay. The computing system could then take action to cause setup for the UE of EN-DC service provided by the determined eNB-gNB pair.

With this example implementation, if the computing system is at the 4G eNB 14 (e.g., provided by a host processor or the like of the 4G eNB), the computing system could select the eNB-gNB pair to provide the UE with EN-DC service and could take action to make that happen. Without limitation, this might involve the 4G eNB 14 using eNB-gNB communication delay as a basis to select a 5G gNB to use as SN for the UE and the 4G eNB 14 then adding for the UE a secondary connection with that selected 5G gNB. Or it might involve the 4G eNB 14 using eNB-gNB communication delay as a basis to decide whether itself or 4G eNB 12 should be the UE's MN and taking action to implement that decision, followed by the UE's MN then adding for the UE a secondary connection with a 5G gNB.

Alternatively, if the computing system is at the EMS 40 or elsewhere, the computing system could similarly use eNB-gNB communication delay as a basis to select an eNB-gNB pair to provide the UE with EN-DC service and, through signaling with the 4G eNB 14 and/or one or more other entities, cause EN-DC service for the UE to be set up accordingly.

As a specific example of this, when the UE is connected with just the 4G eNB 14, if the UE reports to the 4G eNB 14 that the UE is within threshold strong coverage of both 5G gNB 16 and 5G gNB 18, the 4G eNB could establish and/or refer to eNB-gNB communication-delay data as described above to determine the communication delay respectively (i) between the 4G eNB 14 and the 5G gNB 16 and (ii) between the 4G eNB 14 and the 5G gNB 18. And the 4G eNB 14 could compare those determined communication delays and, based on the comparison, select the 5G gNB with which the 4G eNB 14 has the lower communication delay. Based on that selection, the 4G eNB 14 could then proceed to set up EN-DC service for the UE with the selected 5G gNB as the UE's SN.

And as another example, when the UE is connected with just the 4G eNB 14, if the UE reports to the 4G eNB 14 that the UE is within threshold strong coverage of just 5G gNB 16 and also with threshold strong coverage of 4G eNB 12, the 4G eNB 14 could then query 5G gNB 16 and/or another source of the relevant eNB-gNB communication-delay data, to determine the communication delay respectively (i) between the 5G gNB 16 and 4G eNB 14 and (ii) between the 5G gNB 16 and 4G eNB 12. And the 4G eNB 14 could compare those determined communication delays and, based on the comparison, select between the 4G eNB 14 and the 4G eNB 12 based on the selected 5G gNB 16 having lower communication delay with the selected 4G eNB than with the other 4G eNB.

If the 4G eNB 14 thereby selects itself (based on the 5G gNB 16 having lower communication delay with the 4G eNB 14 than with the 4G eNB 12), then, based at least on that selection, the 4G eNB 14 could continue to be the UE's MN and could set up EN-DC service for the UE with the 5G gNB 16 as the UE's SN. Whereas, if the 4G eNB 14 thereby selects the 4G eNB 12 (based on the 5G gNB 16 having lower communication delay with the 4G eNB 12 than with the 4G eNB 14), then, based at least on that selection, the 4G eNB 14 could hand over or otherwise transition the UE (using any of various conventional procedures) from being connected with the 4G eNB 14 to being connected instead with the 4G eNB 12. And the 4G eNB 12 could then be the UE's MN and could set up EN-DC service for the UE with the 5G gNB 16 as the UE's SN.

Note that other permutations of this process could be possible as well. For example, if the UE is currently connected with the 4G eNB 14 and reports being within threshold strong coverage of both illustrated 5G gNBs, the computing system might both select 5G gNB 16 To be the UE's SN and decide to transition the UE to be served by 4G eNB 12 as the UE's SN, on grounds that the eNB-gNB communication delay between 4G eNB 12 and 5G gNB 16 is the lowest of eNB-gNB communication delay of various other candidate eNB-gNB pairs. Further, other factors in addition to eNB-gNB communication delay could also be taken into account as a further basis to select an eNB-gNB pair to provide the UE with EN-DC service.

Figure 2:
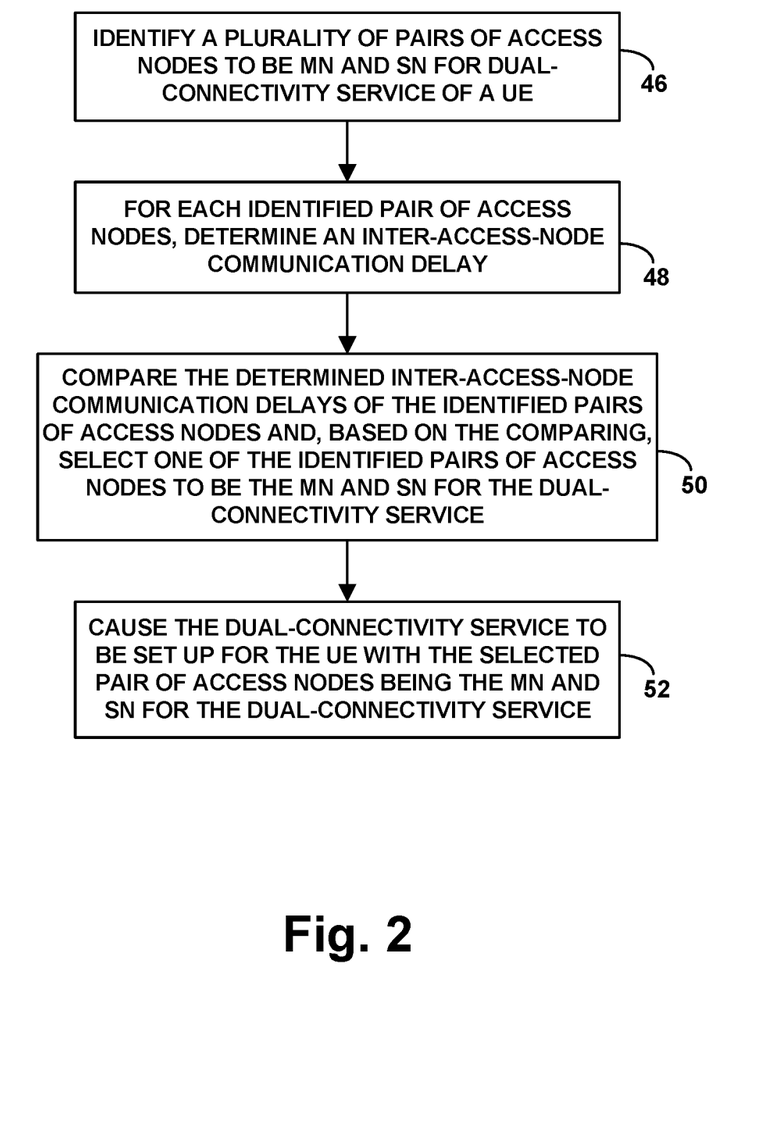
FIG. 2 is a flow chart depicting a method that could be carried out in accordance with the present disclosure.

FIG. 2 is a flow chart depicting a method that could be carried out in accordance with the present disclosure, to control configuration of dual-connectivity service for a UE, with the dual-connectivity service involving the UE being served concurrently by an MN over a first air-interface connection and by an SN over a second air-interface connection.

As shown in FIG. 2, at block 46, the method includes identifying a plurality of pairs of access nodes to be the MN and SN for the dual-connectivity service. Further, at block 48, the method includes, for each identified pair of access nodes, determining an inter-access-node communication delay. And at block 50, the method then includes comparing the determined inter-access-node communication delays of the identified pairs of access nodes and, based on the comparing, selecting one of the identified pairs of access nodes to be the MN and SN for the dual-connectivity service. At block 52, the method includes causing the dual-connectivity service to be set up for the UE with the selected pair of access nodes being the MN and SN for the dual-connectivity service.

As discussed above, for each pair of access nodes, the inter-access-node communication delay could represent a round-trip transmission delay between the access nodes of the pair or a one-way transmission delay between the access nodes of the pair, though the same type of metric should optimally be used for each pair to facilitate fair comparison.

In addition, the act of determining the inter-access-node communication delay per pair of access nodes could take various forms, including possibly querying another entity that could provide the data. Further, the determining of the inter-access-node communication delay could be predictive based on one or more past delay measurements and/or based on measuring delay in real time after identifying the plurality of pairs.

Further, as discussed above, the act of selecting, based on the comparing, one of the identified pair of access nodes to be the MN and SN for the dual-connectivity service could involve (i) determining, based at least on the comparing, that a first one of the identified pairs of access nodes has a lower inter-access-node communication delay than a second one of the identified pairs of access nodes and (ii) based at least on the determining, selecting to be the MN and SN for the dual-connectivity service the first pair of access nodes rather than the second pair of access nodes.

In an example of this as discussed above, the operations of the method could be carried out when (i) the UE has the first air-interface connection with a first access node as the MN for the dual-connectivity service and (ii) the UE is within coverage of a second access node that could be the SN for the dual-connectivity service and is also within coverage of a third access node that could be the SN for the dual-connectivity service. (Here and elsewhere, "could be" could mean "able to be" or the like, given the circumstances. For instance, an access node "could be" an SN for the dual-connectivity service of the UE if the UE is within coverage of the access node and the access node and UE support the access node serving as the SN, among other possibilities.)

In that case, for instance, the identified pairs of access nodes could include (i) a first pair being the first access node as the MN with the second access node as the SN and (ii) a second pair being the first access node as the MN with the third access node as the SN. And the act of selecting, based on the comparing, one of the identified pair of access nodes to be the MN and SN for the dual-connectivity service could involve selecting to be the MN and SN the first pair rather than the second pair, with the selecting being based at least on determining that the inter-access-node communication delay between the first access node and the second access node is lower than the inter-access-node communication delay between the first access node and the third access node.

Further, in that case, the act of causing the dual-connectivity service to be set up for the UE with the selected pair of access nodes being the MN and SN for the dual-connectivity service could involve causing establishment of the second air-interface connection between the UE and the second access node, to enable the first and second access nodes to then serve the UE concurrently over the first and second air-interface connections. For instance, this could involve the UE's serving first access node, as MN, deciding to set up that second connection for the UE and then doing so. Or it could involve another entity making that decision and then transmitting to the UE's serving first access node a message interpretable by the first access node to cause the first access node to set up the second connection for the UE, among other possibilities.

In another example as discussed above, operations of the method could be carried out when (i) the UE is connected with a first access node that could be the MN for the dual-connectivity service and the UE is also within coverage of a second access node that could be the MN for the dual-connectivity service, and (ii) the UE is within coverage of a third access node that could be the SN for the dual-connectivity service.

In that case, the identified pairs of access nodes could include (i) a first pair being the first access node as the MN with the third access node as the SN and (ii) a second pair being the second access node as the MN with the third access node as the SN. And the act of selecting, based on the comparing, one of the identified pair of access nodes to be the MN and SN for the dual-connectivity service could involve selecting the first pair rather than the second pair, with the selecting being based at least on determining that the inter-access-node communication delay between the first access node and the third access node is lower than the inter-access-node communication delay between the second access node and the third access node.

Further, in that case, the act of causing the dual-connectivity service to be set up for the UE with the selected pair of access nodes being the MN and SN for the dual-connectivity service could involve causing establishment of the second air-interface connection between the UE and the third access node, to enable the first and third access nodes to then serve the UE concurrently over the first and second air-interface connections. For instance, this could involve causing the first access node to set up that second connection for the UE.

In yet another example, as discussed above, the method could be carried out when (i) the UE is connected with a first access node that could be the MN for the dual-connectivity service and the UE is also within coverage of a second access node that could be the MN for the dual-connectivity service, and (ii) the UE is within coverage of a third access node that could be the SN for the dual-connectivity service.

In that case, the identified pairs of access nodes include (i) a first pair being the first access node as the MN with the third access node as the SN and (ii) a second pair being the second access node as the MN with the third access node as the SN. And the act of selecting, based on the comparing, one of the identified pair of access nodes to be the MN and SN for the dual-connectivity service could involve selecting the second pair rather than the first pair, with the selecting being based at least on determining that the inter-access-node communication delay between the second access node and the third access node is lower than the inter-access-node communication delay between the first access node and the third access node.

Further, in that case, the act of causing the dual-connectivity service to be set up for the UE with the selected pair of access nodes being the MN and SN for the dual-connectivity service could involve handing over or otherwise transitioning the UE from being connected with the first access node to instead having the first air-interface connection with the second access node. (For instance, this could involve the first access node so transitioning the UE, and/or this could involve another entity transmitting to the first access node a message interpretable by the first access node to cause the transition to occur.) And once that transition has occurred, the second access node could then add for the UE the second air-interface connection with the third access node as SN for the dual-connectivity service, so that the second and third access nodes can serve the UE concurrently over the first and second air-interface connections.

Yet further, as discussed above, the first air-interface connection and second air-interface connection could operate according to different RATs than each other. For instance, the first air-interface connection could operate according to 4G LTE, the second air-interface connection could operate according to 5G NR, and the dual-connectivity service could be or otherwise comprise EN-DC service.

Figure 3:
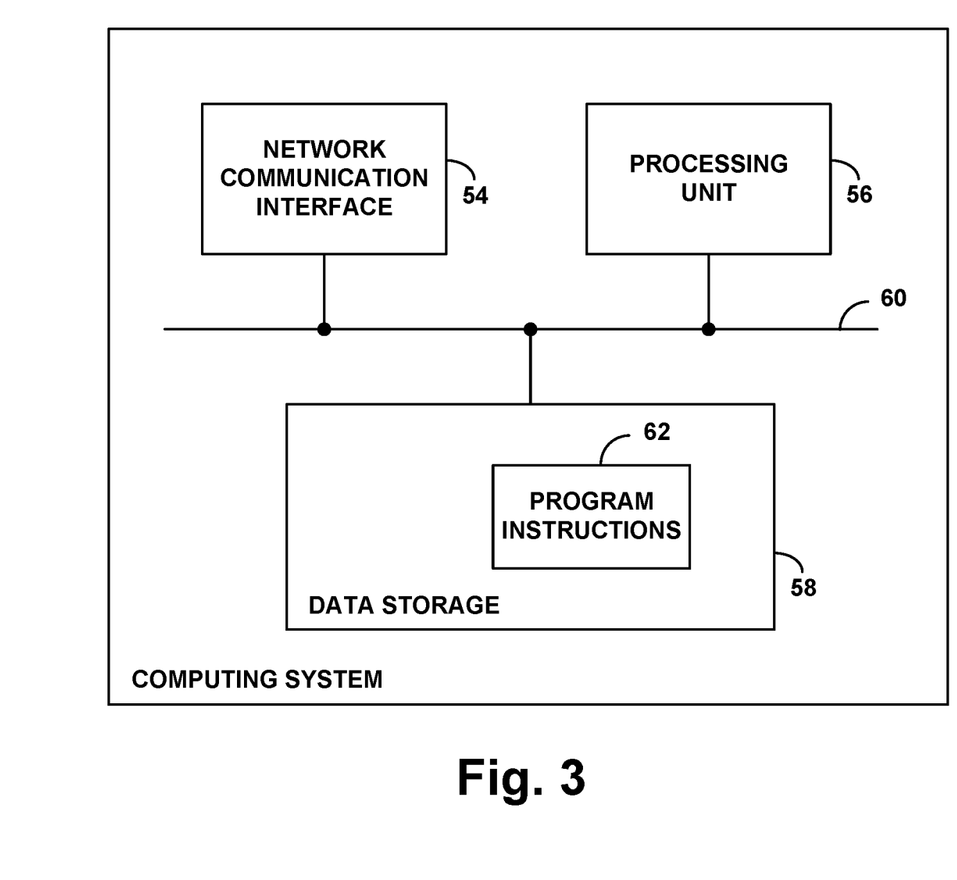
FIG. 3 is a simplified block diagram of an example computing system operable in accordance with the disclosure.

FIG. 3 is next a simplified block diagram of a computing system that could be configured to carry out operations such as those described above. As noted above, this computing system could be provided at an access node currently serving the UE, or at the EMS 40, among other possibilities.

As shown in FIG. 3, the example computing system includes a network communication interface 54, a processing unit 56, and non-transitory data storage 58, all of which could be integrated together and/or interconnected by a system bus, network, or other connection mechanism 60.

The network communication interface 54 could comprise a physical network connector and associated communication logic (e.g., protocol stacks) to facilitate network communication with various other entities. The processing unit 56 could comprise one or more general purpose processors (e.g., microprocessors) and/or one or more special-purpose processors (e.g., application specific integrated circuits). And the non-transitory data storage 58 could comprise one or more volatile and/or non-volatile storage components (e.g., magnetic, optical, or flash storage).

As shown, the data storage 58 could then store program instructions 62, which could be executable by the processing unit 56 to cause the computing system to carry out various operations described herein, such as the operations depicted in FIG. 2 for instance.

Various features described above can be implemented in this context as well, and vice versa.

Figure 4:
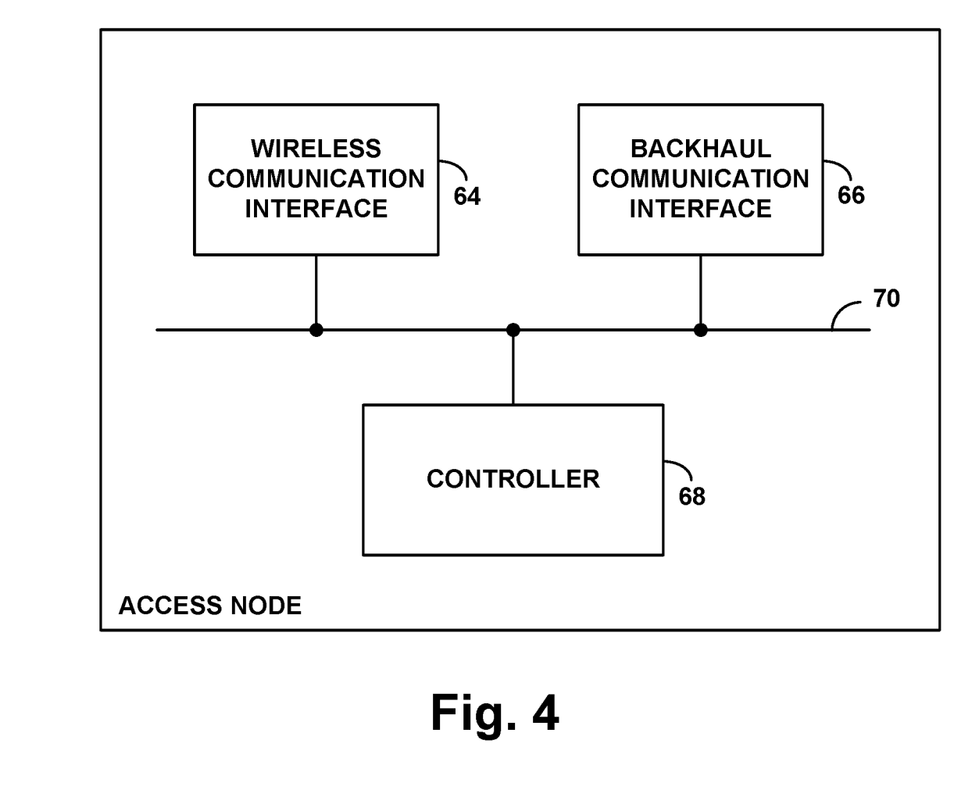
FIG. 4 is a simplified block diagram of an example access node operable in accordance with the disclosure.

FIG. 4 is next a simplified block diagram of an example access node that could operate in a wireless communication system such as that noted above for example, to carry out various features described herein. As shown, the example access node includes a wireless communication interface 64, a backhaul communication interface 66, and a controller 68, all of which could be integrated together and/or communicatively linked together by a system bus, network, or other connection mechanism 70.

In an example implementation, the wireless communication interface 64 could comprise an antenna structure, which could be tower mounted or could take other forms, and associated components such as a power amplifier and a wireless transceiver, so as to facilitate providing a coverage area defining an air interface and engaging air-interface communication on the air interface. And the backhaul communication interface 66 could comprise a wired or wireless interface, such as an Ethernet network communication interface, configured to support backhaul communication as discussed above.

Further, the controller 68 (which might be provided by a BBU of the access node, for instance) could comprise one or more processing units (e.g., one or more general purpose processors and/or specialized processors) programmed to cause the access node to carry out various operations such as those discussed herein, including for example the operations depicted in FIG. 2.

Various other features discussed herein can be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method to control configuration of dual-connectivity service for a user equipment device (UE), wherein the dual-connectivity service includes the UE being served concurrently by a master access node (MN) over a first air-interface connection and by a secondary access node (SN) over a second air-interface connection, the method comprising:
   identifying a plurality of pairs of access nodes as candidate pairs of access nodes to be the MN and SN for the dual-connectivity service;
   for each identified pair of access nodes, determining an inter-access-node communication delay;
   comparing the determined inter-access-node communication delays of the identified pairs of access nodes and, based on the comparing, selecting one of the identified pairs of access nodes to be the MN and SN for the dual-connectivity service, wherein selecting, based on the comparing, one of the identified pair of access nodes to be the MN and SN for the dual-connectivity service comprises (i) determining, based at least on the comparing, that a first one of the identified pairs of access nodes has a lower inter-access-node communication delay than a second one of the identified pairs of access nodes and (ii) based at least on the determining, selecting to be the MN and SN for the dual-connectivity service the first pair of access nodes rather than the second pair of access nodes; and
   causing the dual-connectivity service to be set up for the UE with the selected pair of access nodes being the MN and SN for the dual-connectivity service.

2. The method of claim 1, wherein for each pair of access nodes, the inter-access-node communication delay represents round-trip transmission delay between the access nodes of the pair.

3. The method of claim 2, wherein for each pair of access nodes, the inter-access-node communication delay represents one-way transmission delay between the access nodes of the pair.

4. The method of claim 1, wherein determining the inter-access-node communication delay is predictive based on one or more past delay measurements.

5. The method of claim 1, wherein determining the inter-access-node communication delay is based on measuring delay in real time after identifying the plurality of pairs.

6. The method of claim 1,
   wherein the method is carried out when (i) the UE has the first air-interface connection with a first access node as the MN for the dual-connectivity service and (ii) the UE is within coverage of a second access node that could be the SN for the dual-connectivity service and is also within coverage of a third access node that could be the SN for the dual-connectivity service,
   wherein the identified pairs of access nodes include (i) a first pair being the first access node as the MN with the second access node as the SN and (ii) a second pair being the first access node as the MN with the third access node as the SN, and
   wherein selecting, based on the comparing, one of the identified pair of access nodes to be the MN and SN for the dual-connectivity service comprises selecting to be the MN and SN the first pair rather than the second pair, with the selecting being based at least on determining that the inter-access-node communication delay between the first access node and the second access node is lower than the inter-access-node communication delay between the first access node and the third access node.

7. The method of claim 6, wherein causing the dual-connectivity service to be set up for the UE with the selected pair of access nodes being the MN and SN for the dual-connectivity service comprises causing establishment of the second air-interface connection between the UE and the second access node, to enable the first and second access nodes to then serve the UE concurrently over the first and second air-interface connections.

8. The method of claim 1,
   wherein the method is carried out when (i) the UE is connected with a first access node that could be the MN for the dual-connectivity service and the UE is also within coverage of a second access node that could be the MN for the dual-connectivity service, and (ii) the UE is within coverage of a third access node that could be the SN for the dual-connectivity service,
   wherein the identified pairs of access nodes include (i) a first pair being the first access node as the MN with the third access node as the SN and (ii) a second pair being the second access node as the MN with the third access node as the SN, and
   wherein selecting, based on the comparing, one of the identified pair of access nodes to be the MN and SN for the dual-connectivity service comprises selecting the first pair rather than the second pair, with the selecting being based at least on determining that the inter-access-node communication delay between the first access node and the third access node is lower than the inter-access-node communication delay between the second access node and the third access node.

9. The method of claim 8, wherein causing the dual-connectivity service to be set up for the UE with the selected pair of access nodes being the MN and SN for the dual-connectivity service comprises causing establishment of the second air-interface connection between the UE and the third access node, to enable the first and third access nodes to then serve the UE concurrently over the first and second air-interface connections.

10. The method of claim 1,
   wherein the method is carried out when (i) the UE is connected with a first access node that could be the MN for the dual-connectivity service and the UE is also within coverage of a second access node that could be the MN for the dual-connectivity service, and (ii) the UE is within coverage of a third access node that could be the SN for the dual-connectivity service,
   wherein the identified pairs of access nodes include (i) a first pair being the first access node as the MN with the third access node as the SN and (ii) a second pair being the second access node as the MN with the third access node as the SN, and
   wherein selecting, based on the comparing, one of the identified pair of access nodes to be the MN and SN for the dual-connectivity service comprises selecting the second pair rather than the first pair, with the selecting being based at least on determining that the inter-access-node communication delay between the second access node and the third access node is lower than the inter-access-node communication delay between the first access node and the third access node.

11. The method of claim 10, wherein causing the dual-connectivity service to be set up for the UE with the selected pair of access nodes being the MN and SN for the dual-connectivity service comprises transitioning the UE from being connected with the first access node to instead having the first air-interface connection with the second access node, whereby the second access node could then add for the UE the second air-interface connection with the third access node as SN for the dual-connectivity service, so that the second and third access nodes can serve the UE concurrently over the first and second air-interface connections.

12. The method of claim 1, wherein the first air-interface connection and second air-interface connection operate according to different radio access technologies than each other.

13. The method of claim 12, wherein the first air-interface connection operates according to 4G Long Term Evolution (4G LTE), the second air-interface connection operates according to 5G New Radio (5G NR), and the dual-connectivity service comprises EUTRA-NR Dual Connectivity (EN-DC) service.

14. A computing system for controlling configuration of dual-connectivity service for a user equipment device (UE), wherein the dual-connectivity service includes the UE being served concurrently by a master access node (MN) over a first air-interface connection and by a secondary access node (SN) over a second air-interface connection, the computing system comprising:

a processing unit;

non-transitory data storage; and program instructions stored in the non-transitory data storage and executable by the processing unit to carry out operations including:

identifying a plurality of pairs of access nodes as candidate pairs of access nodes to be the MN and SN for the dual-connectivity service, for each identified pair of access nodes, determining an inter-access-node communication delay, comparing the determined inter-access-node communication delays of the identified pairs of access nodes and, based on the comparing, selecting one of the identified pairs of access nodes to be the MN and SN for the dual-connectivity service, wherein selecting, based on the comparing, one of the identified pair of access nodes to be the MN and SN for the dual-connectivity service comprises (i) determining based on the comparing that a first one of the identified pairs of access nodes has a lower inter-access-node communication delay than a second one of the identified pairs of access nodes and (ii) based at least on the determining, selecting to be the MN and SN for the dual-connectivity service the first pair of access nodes rather than the second pair of access nodes, and causing the dual-connectivity service to be set up for the UE with the selected pair of access nodes being the MN and SN for the dual-connectivity service.

15. The computing system of claim 14, wherein the operations are executable when (i) the UE has the first air-interface connection with a first access node as the MN for the dual-connectivity service and (ii) the UE is within coverage of a second access node that could be the SN for the dual-connectivity service and is also within coverage of a third access node that could be the SN for the dual-connectivity service, wherein the identified pairs of access nodes include (i) a first pair being the first access node as the MN with the second access node as the SN and (ii) a second pair being the first access node as the MN with the third access node as the SN, and wherein selecting, based on the comparing, one of the identified pair of access nodes to be the MN and SN for the dual-connectivity service comprises selecting to be the MN and SN the first pair rather than the second pair, with the selecting being based at least on determining that the inter-access-node communication delay between the first access node and the second access node is lower than the inter-access-node communication delay between the first access node and the third access node.

16. The computing system of claim 14, wherein the operations are executable when (i) the UE is connected with a first access node that could be the MN for the dual-connectivity service and the UE is also within coverage of a second access node that could be the MN for the dual-connectivity service, and (ii) the UE is within coverage of a third access node that could be the SN for the dual-connectivity service, wherein the identified pairs of access nodes include (i) a first pair being the first access node as the MN with the third access node as the SN and (ii) a second pair being the second access node as the MN with the third access node as the SN, and wherein selecting, based on the comparing, one of the identified pair of access nodes to be the MN and SN for the dual-connectivity service comprises selecting the first pair rather than the second pair, with the selecting being based at least on determining that the inter-access-node communication delay between the first access node and the third access node is lower than the inter-access-node communication delay between the second access node and the third access node.

17. The computing system of claim 14, wherein the operations are executable when (i) the UE is connected with a first access node that could be the MN for the dual-connectivity service and the UE is also within coverage of a second access node that could be the MN for the dual-connectivity service, and (ii) the UE is within coverage of a third access node that could be the SN for the dual-connectivity service, wherein the identified pairs of access nodes include (i) a first pair being the first access node as the MN with the third access node as the SN and (ii) a second pair being the second access node as the MN with the third access node as the SN, and wherein selecting, based on the comparing, one of the identified pair of access nodes to be the MN and SN for the dual-connectivity service comprises selecting the second pair rather than the first pair, with the selecting being based at least on determining that the inter-access-node communication delay between the second access node and the third access node is lower than the inter-access-node communication delay between the first access node and the third access node.

18. The computing system of claim 14, wherein the computing system is at an access node that is a candidate MN for the dual-connectivity service.

19. At least one non-transitory computer-readable medium having stored thereon program instructions executable by at least one processing unit to carry out operations for controlling configuration of dual-connectivity service for a user equipment device (UE), wherein the dual-connectivity service includes the UE being served concurrently by a master access node (MN) over a first air-interface connection and by a secondary access node (SN) over a second air-interface connection, the operations comprising:

identifying a plurality of pairs of access nodes as candidate pairs of access nodes to be the MN and SN for the dual-connectivity service;

for each identified pair of access nodes, determining an inter-access-node communication delay;

comparing the determined inter-access-node communication delays of the identified pairs of access nodes and, based on the comparing, selecting one of the identified pairs of access nodes to be the MN and SN for the dual-connectivity service, wherein selecting, based on the comparing, one of the identified pair of access nodes to be the MN and SN for the dual-connectivity service comprises (i) determining based on the comparing that a first one of the identified pairs of access nodes has a lower inter-access-node communication delay than a second one of the identified pairs of access nodes and (ii) based at least on the determining, selecting to be the MN and SN for the dual-connectivity service the first pair of access nodes rather than the second pair of access nodes; and causing the dual-connectivity service to be set up for the UE with the selected pair of access nodes being the MN and SN for the dual-connectivity service.

\* \* \* \* \*